(12) United States Patent
Inoue et al.

(10) Patent No.: US 9,407,531 B2
(45) Date of Patent: Aug. 2, 2016

(54) COMMUNICATION SYSTEM

(75) Inventors: Yoshinori Inoue, Kawasaki (JP); Fumihiko Yokota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 920 days.

(21) Appl. No.: 13/448,698

(22) Filed: Apr. 17, 2012

(65) Prior Publication Data

US 2012/0201141 A1 Aug. 9, 2012

Related U.S. Application Data

(63) Continuation of application No. PCT/JP2009/068243, filed on Oct. 23, 2009.

(51) Int. Cl.
  *H04L 12/721* (2013.01)
  *H04L 12/723* (2013.01)
  *H04L 12/703* (2013.01)

(52) U.S. Cl.
  CPC .............. *H04L 45/12* (2013.01); *H04L 45/507* (2013.01); *H04L 45/28* (2013.01)

(58) Field of Classification Search
  CPC ....... H04L 45/12; H04L 45/22; H04L 45/123; H04L 45/127
  See application file for complete search history.

(56) References Cited

U.S. PATENT DOCUMENTS

| | | | |
|---|---|---|---|
| 6,639,897 B1 | 10/2003 | Shiomoto et al. | |
| 7,330,440 B1 * | 2/2008 | Bryant et al. | 370/254 |
| 8,031,720 B2 | 10/2011 | Yagyu | |
| 2004/0252643 A1 * | 12/2004 | Joshi | 370/238 |
| 2005/0021857 A1 * | 1/2005 | Balassanian | 709/245 |
| 2006/0233175 A1 * | 10/2006 | Ge et al. | 370/392 |
| 2007/0147255 A1 * | 6/2007 | Oyman | 370/238 |

(Continued)

FOREIGN PATENT DOCUMENTS

| | | |
|---|---|---|
| CN | 1922832 A | 2/2007 |
| CN | 100484293 C | 4/2009 |

(Continued)

OTHER PUBLICATIONS

International Search Report dated Dec. 1, 2009, from corresponding International Application No. PCT/JP2009/068243.

(Continued)

*Primary Examiner* — Scott M Sciacca
(74) *Attorney, Agent, or Firm* — Katten Muchin Rosenman LLP

(57) ABSTRACT

In a relaying apparatus, a label information controller generates and transmits label information including at least one of communication medium information on communication media for use in communication with other apparatuses and communication cost information on communication costs that are generated when communication is performed via the relaying apparatus. In a communication apparatus, a route controller receives the label information, creates a list of routes for use in communication with a communication counterpart, and detects a communication route through which communication is to be performed from the list. The route controller creates a list of all routes including, out of relaying apparatuses, relaying apparatuses which enable communication with a counterpart apparatus using a communication medium which the communication apparatus has, and based on the communication cost information included in the label information, detects a communication route which is lowest in communication costs from the list.

8 Claims, 22 Drawing Sheets

(56) References Cited

U.S. PATENT DOCUMENTS

| | | |
|---|---|---|
| 2007/0192434 A1 | 8/2007 | Kodama et al. |
| 2007/0237135 A1* | 10/2007 | Trevallyn-Jones et al. ... 370/354 |
| 2007/0280192 A1 | 12/2007 | Yagyu et al. |
| 2007/0286097 A1* | 12/2007 | Davies .......................... 370/255 |
| 2008/0089327 A1* | 4/2008 | Lu et al. ....................... 370/389 |
| 2008/0101359 A1* | 5/2008 | Storry et al. ................. 370/390 |
| 2008/0298252 A1* | 12/2008 | Yonge et al. ................. 370/238 |

FOREIGN PATENT DOCUMENTS

| | | |
|---|---|---|
| JP | 11-308276 | 11/1999 |
| JP | 2000-196610 | 7/2000 |
| JP | 2002-509406 | 3/2002 |
| JP | 2003-37618 | 2/2003 |
| JP | 2003-244196 | 8/2003 |
| JP | 2005-252662 | 9/2005 |
| JP | 2007-215090 | 8/2007 |
| JP | 2008-85837 | 4/2008 |
| WO | 99/31911 | 6/1999 |
| WO | 2005079025 | 8/2005 |

OTHER PUBLICATIONS

Chinese Office Action dated Feb. 8, 20014, from the corresponding Chinese Application No. 200980162008.5.

Chinese Office Action dated Dec. 4, 2014, from the corresponding ChineseApplication No. 200980162008.5.

Japanese Office Action dated Oct. 2, 2012 from the corresponding Japanese Application No. 2011-537072.

* cited by examiner

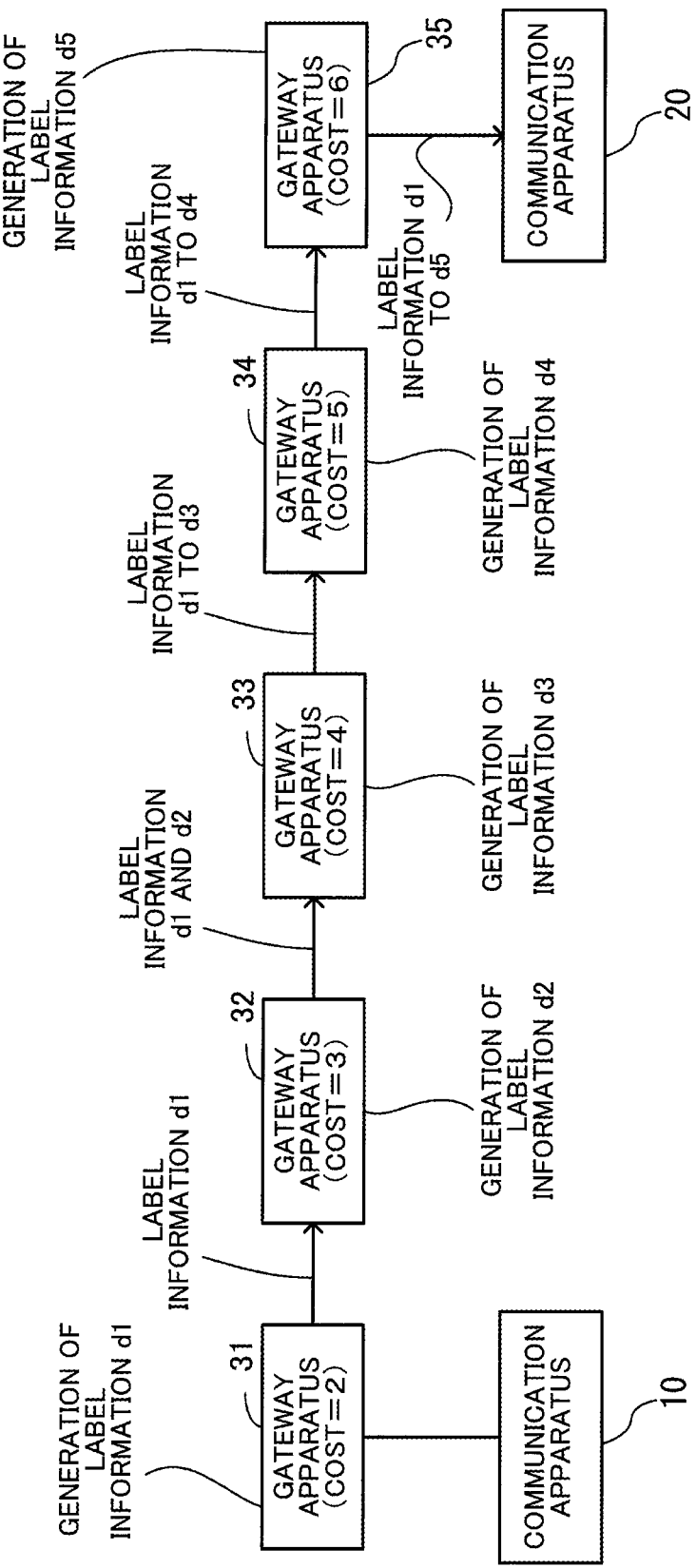

FIG. 6

| | COMMUNICATION COST INFORMATION | COMMUNICATION MEDIUM INFORMATION |
|---|---|---|
| LABEL INFORMATION d1 | COST OF GATEWAY APPARATUS 31 = 2 | COMMUNICATION MEDIUM OF GATEWAY APPARATUS 31 = A, B |
| LABEL INFORMATION d2 | COST OF GATEWAY APPARATUS 32 = 3 | COMMUNICATION MEDIUM OF GATEWAY APPARATUS 32 = A, B |
| LABEL INFORMATION d3 | COST OF GATEWAY APPARATUS 33 = 4 | COMMUNICATION MEDIUM OF GATEWAY APPARATUS 33 = A, B |
| LABEL INFORMATION d4 | COST OF GATEWAY APPARATUS 34 = 5 | COMMUNICATION MEDIUM OF GATEWAY APPARATUS 34 = A, B |
| LABEL INFORMATION d5 | COST OF GATEWAY APPARATUS 35 = 6 | COMMUNICATION MEDIUM OF GATEWAY APPARATUS 35 = A, B |

| MEDIUM CONVERSION INFORMATION (A-B) | CONVERSION FUNCTION, WHICH GATEWAY APPARATUS 31 HAS, IN DIRECTION FROM COMMUNICATION APPARATUS 10 TOWARD COMMUNICATION APPARATUS 20 AND IN DIRECTION FROM COMMUNICATION APPARATUS 20 TOWARD COMMUNICATION APPARATUS 10 |
|---|---|
| MEDIUM CONVERSION INFORMATION (B-A) | CONVERSION FUNCTION, WHICH GATEWAY APPARATUS 32 HAS, IN DIRECTION FROM COMMUNICATION APPARATUS 10 TOWARD COMMUNICATION APPARATUS 20 AND IN DIRECTION FROM COMMUNICATION APPARATUS 20 TOWARD COMMUNICATION APPARATUS 10 |

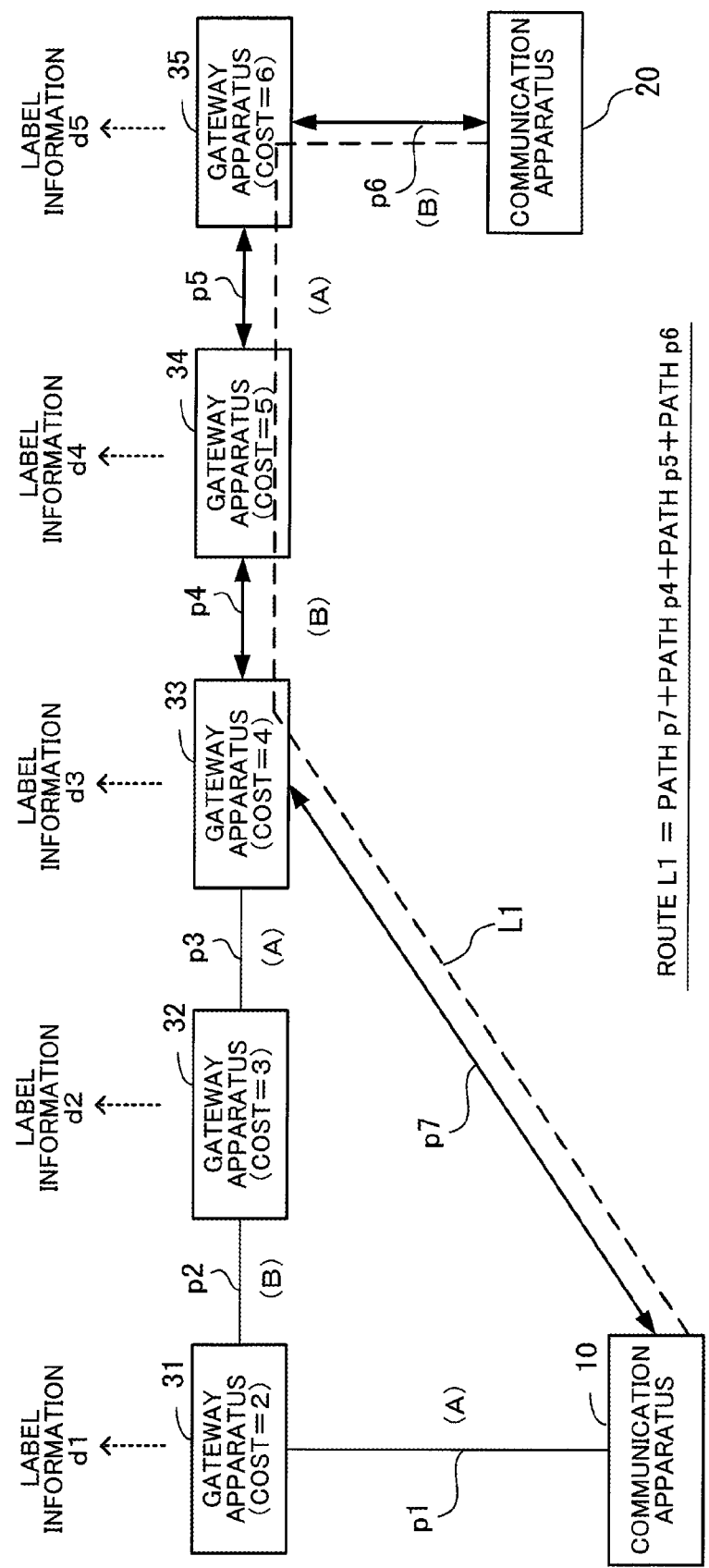

FIG. 15

ROUTE LIST

| | APPARATUSES LOCATED ON ROUTE | PATHS OF ROUTE |
|---|---|---|
| ROUTE L1 | COMMUNICATION APPARATUS 10, GATEWAY APPARATUSES 33, 34, 35, COMMUNICATION APPARATUS 20 | PATH p7, PATH p4, PATH p5, PATH p6 |
| ROUTE L2 | COMMUNICATION APPARATUS 10, GATEWAY APPARATUS 33, COMMUNICATION APPARATUS 20 | PATH p7, p12 |
| ROUTE L3 | COMMUNICATION APPARATUS 10, GATEWAY APPARATUSES 35, COMMUNICATION APPARATUS 20 | PATH p8, PATH p6 |
| ROUTE L4 | COMMUNICATION APPARATUS 10, GATEWAY APPARATUSES 31, 34, 35, COMMUNICATION APPARATUS 20 | PATH p1, PATH p9, PATH p5, PATH p6 |
| ROUTE L5 | COMMUNICATION APPARATUS 10, GATEWAY APPARATUSES 31, COMMUNICATION APPARATUS 20 | PATH p1, PATH p10 |
| ROUTE L6 | COMMUNICATION APPARATUS 10, GATEWAY APPARATUSES 31, 32, 35, COMMUNICATION APPARATUS 20 | PATH p1, PATH p2, PATH p11, PATH p6 |
| ROUTE L7 | COMMUNICATION APPARATUS 10, GATEWAY APPARATUSES 31, 32, 33, COMMUNICATION APPARATUS 20 | PATH p1, PATH p2, PATH p3, PATH p12 |
| ROUTE L8 | COMMUNICATION APPARATUS 10, GATEWAY APPARATUSES 31, 32, 33, 34, 35, COMMUNICATION APPARATUS 20 | PATH p1, PATH p2, PATH p3, PATH p4, PATH p5, PATH p6 |

FIG. 19
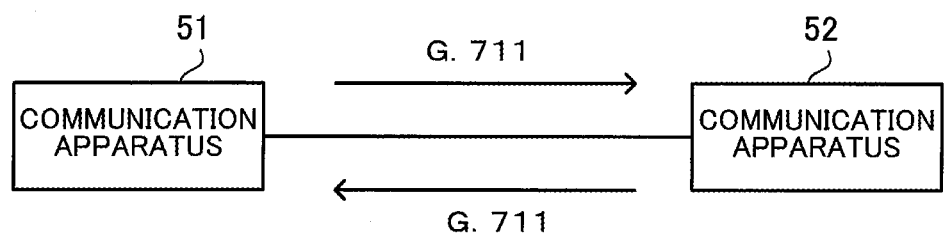
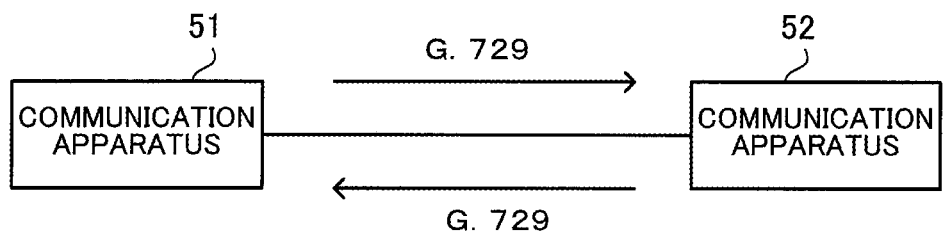

COMMUNICATION SYSTEM

CROSS-REFERENCE TO RELATED APPLICATION

This application is a continuing application, filed under 35 U.S.C. §111(a), of International Application PCT/JP2009/068243, filed on Oct. 23, 2009.

FIELD

The embodiments discussed herein are related to a communication system for performing information communication.

BACKGROUND

The VoIP (Voice over Internet Protocol) is a technique for performing audio communication over an IP (Internet Protocol) network, and is widely applied e.g. to internet telephones and extension telephones using an interoffice LAN (local Area Network).

In the VoIP, basic call control of a session as a connection relationship between applications operated on the IP network (start, change and disconnection of the session) is carried out using a protocol called SIP (Session Initiation Protocol).

Further, a protocol called SDP (Session Description Protocol) is used for handling a session. SDP cooperates with SIP to perform session negotiation, and select an audio medium to execute audio communication.

FIG. 19 illustrates audio communication using VoIP. Communication apparatuses 51 and 52 both include an ITU-T G. 711 audio medium as an audio medium. The communication apparatuses 51 and 52 perform session negotiation using SDP, and thereafter performs audio communication with each other via the respective ITU-T G. 711 audio media.

Alternatively, if the communication apparatuses 51 and 52 both include an ITU-T G. 729 audio medium as an audio medium, the communication apparatuses 51 and 52 perform session negotiation using SDP, and thereafter perform audio communication with each other via the respective ITU-T G. 729 audio media.

Note that ITU-T G. 711 is an audio compression algorithm using a PCM (Pulse Code Modulation) audio codec (CODEC: encoding and decoding), and ITU-TG. 729 is an audio compression algorithm using a CS-ACELP (Conjugate Structure-Algebraic Code Excited Linear Prediction) audio codec.

As a conventional technique, there has been proposed a technique of a multimedia communication system in which both users connected through the VoIP communication system can select a communication medium independently of each other (Japanese Laid-open Patent Publication No. 2008-085837). Further, there has been proposed a technique of a VoIP gateway apparatus which automatically selects an optimum service out of a plurality of IP phone services to which a user subscribes (Japanese Laid-open Patent Publication No. 2005-252662).

In the VoIP audio communication, as described above, when the self apparatus and a counterpart apparatus both have a function of the same audio medium, it is possible to perform direct audio communication between them. However, if the both apparatuses do not have the same audio medium, the apparatuses perform communication via a gateway apparatus having a medium conversion function.

FIG. 20 illustrates VoIP audio communication via a gateway apparatus. It is assumed that the communication apparatus 51 includes the ITU-T G. 711 audio medium, and the communication apparatus 52 includes the ITU-T G. 729 audio medium.

Further, a gateway apparatus 5 includes both of the ITU-T G. 711 audio medium and the ITU-T G. 729 audio medium. That is, the gateway apparatus 53 has a function of interconversion between ITU-T G. 711 and ITU-T G. 729.

In general, a gateway apparatus is installed at a border between networks, and performs medium conversion of communication data when the communication data is transmitted across the border between the networks. The gateway apparatus on the VoIP network is realized e.g. by an SIP server.

When the communication apparatuses 51 and 52 perform communication with each other, the gateway apparatus 53 converts ITU-T G. 711 audio data transmitted from the communication apparatus 51 to ITU-T G. 729 audio data, and transmits the converted audio data to the communication apparatus 52. Further, the gateway apparatus 53 converts ITU-T G. 729 audio data transmitted from the communication apparatus 52 to ITU-T G. 711 audio data, and transmits the converted audio data to the communication apparatus 51.

FIG. 21 illustrates VoIP audio communication via gateway apparatuses. FIG. 21 illustrates a network state in which a plurality of gateway apparatuses are installed. A gateway apparatus 53-1 includes the ITU-T G. 711 audio medium and an AMR (adaptive multi rate) audio medium, and performs interconversion of audio data between ITU-T G. 711 and AMR.

A gateway apparatus 53-2 includes the ITU-T G. 729 medium and the AMR audio medium, and performs interconversion of audio data between ITU-T G. 729 and AMR. Note that AMR is an audio codec used in third-generation mobile communication, and is a standard system developed by 3GP ($3^{rd}$ generation partnership project).

When the communication apparatuses 51 and 52 perform communication with each other, the gateway apparatus 53-1 converts ITU-T G. 711 audio data transmitted from the communication apparatus 51 to AMR audio data, and transmits the converted audio data to the gateway apparatus 53-2. The gateway apparatus 53-2 converts the AMR audio data to ITU-T G. 729 audio data, and transmits the converted audio data to the communication apparatus 52.

Further, the gateway apparatus 53-2 converts ITU-T G. 729 audio data transmitted from the communication apparatus 52 to AMR audio data, and transmits the converted audio data to the gateway apparatus 53-1. The gateway apparatus 53-1 converts the AMR audio data to ITU-T G. 711 audio data, and transmits the converted audio data to the communication apparatus 51.

As described above, when the communication apparatuses 51 and 52 include the audio media different from each other, it is not possible to perform direct communication between the apparatuses, and hence communication is performed via the gateway apparatus(s) where medium conversion is performed.

However, in the conventional techniques, there has been no means for recognizing which type of an audio medium is provided in the gateway apparatus or the other end of communication, and further it has been impossible to recognize which gateway apparatus can provide a pass to be established for minimizing communication costs. This brings about a problem of a higher possibility of establishing a wasteful path routed through a plurality of gateway apparatuses, resulting in degraded communication efficiency.

FIG. 22 illustrates VoIP audio communication via gateway apparatuses. It is assumed here that the gateway apparatus 53-1 illustrated in FIG. 21 includes, as audio media, not only the ITU-T G. 711 audio medium and the AMR audio medium but also the ITU-T G. 729 audio medium (i.e. the gateway apparatus 53-1 has a function of interconverting these three audio media).

In this case, when the communication apparatuses 51 and 52 perform communication with each other, it is possible to perform communication only via the gateway apparatus 53-1 without being routed through the gateway apparatus 53-2. However, in the conventional techniques, it is impossible to recognize that the gateway apparatus 53-1 also includes the ITU-T G. 729 audio medium that the gateway apparatus 53-2 has, and hence there is a possibility that communication is performed by being unnecessarily routed through the two gateway apparatuses 53-1 and 53-2, causing degraded communication efficiency.

Further, particularly when communication is performed over a plurality of networks, since a plurality of gateway apparatuses are installed, communication data sometimes passes through a plurality of gateway apparatuses unnecessary for the data to pass through, which causes marked degradation of communication efficiency. Although the VoIP audio communication has been described, by way of example, the same problem can be caused in other communication protocols and communication media.

SUMMARY

According to one aspect of the present invention, there is provided a communication system. This communication system includes a plurality of relaying apparatuses each including a label information control unit that generates and transmits label information including communication medium information, which is information on a communication medium for use in communication with other apparatuses, and communication cost information, which is information on communication costs; and a communication apparatus including a route control unit that receives the label information to create a list of routes for use in communication with the other end of communication, and detects a communication route through which communication is to be performed, from the list of routes, and a communication control unit that performs control of communication with the other end of communication, wherein the label information control unit transmits the label information transmitted and received from other relaying apparatuses and the label information related to the self relaying apparatus together, toward the communication apparatus, wherein the route control unit: recognizes the communication medium of the other end of communication and the respective communication media of the plurality of relaying apparatuses, based on the communication medium information; creates a list of all routes including, out of the plurality of relaying apparatuses, relaying apparatuses which enable the communication apparatus to communicate with the other end of communication using the communication medium which the self communication apparatus has, when it is determined that the communication medium which the other end of communication has differs from the communication medium which the self communication apparatus has; and recognizes the communication costs of each of the plurality of relaying apparatuses based on the communication cost information, and detects the communication route which is a route lowest in communication costs in the list of routes, and wherein the communication control unit performs communication with the other end of communication through the communication route.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates how label information is transmitted;

FIG. 6 illustrates label information and communication medium information;

FIG. 7 illustrates a route;

FIG. 15 illustrates a route list;

FIG. 19 illustrates VoIP audio communication;

DESCRIPTION OF EMBODIMENTS

Figure 1:
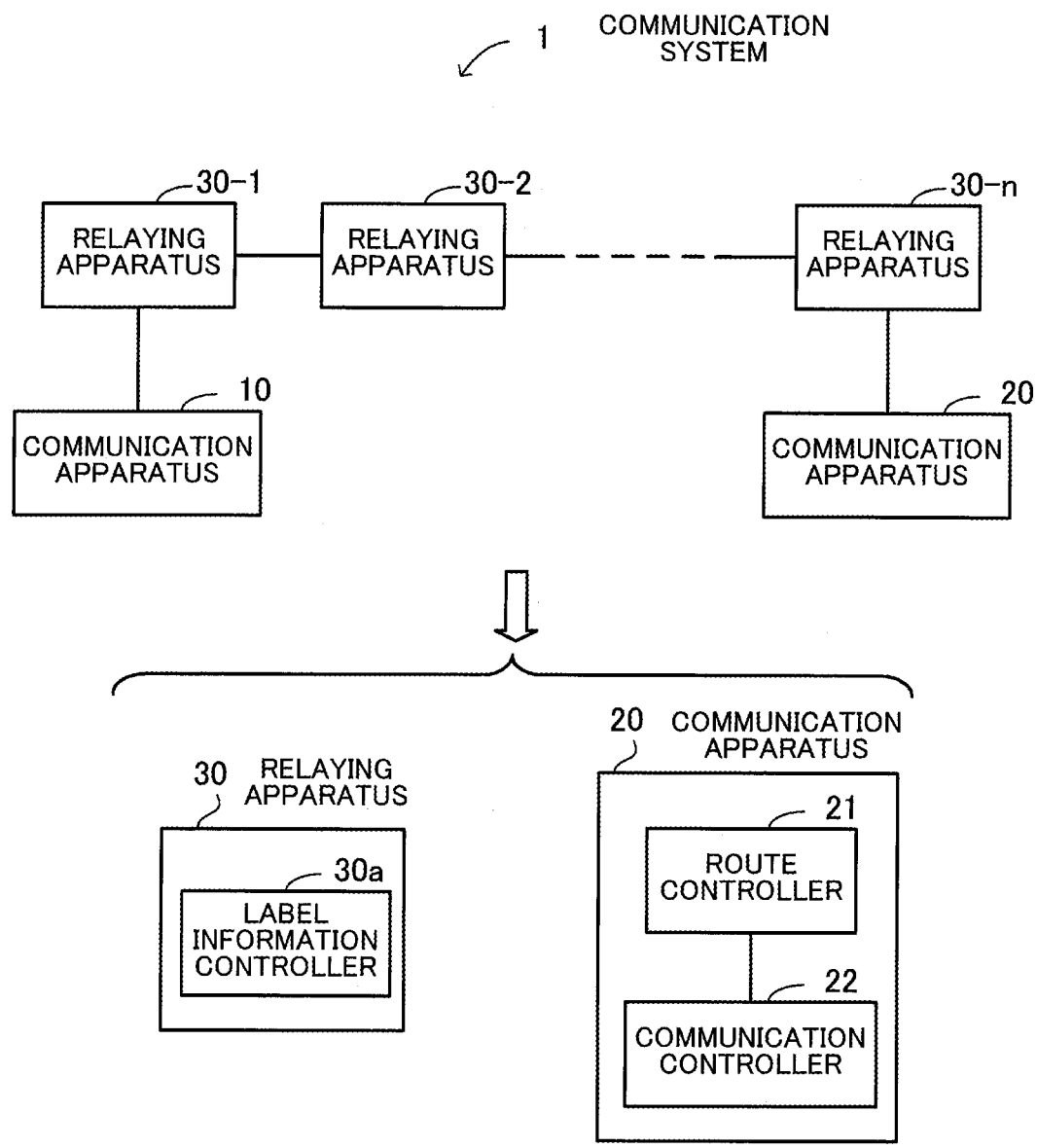
FIG. 1 illustrates a configuration of a communication system.

Embodiments of the present invention will be described below with reference to the accompanying drawings. FIG. 1 illustrates a configuration of a communication system. The communication system 1 includes communication apparatuses 10 and 20, and relaying apparatuses 30-1 to 30-*n* (collectively referred to as the relaying apparatus 30).

The relaying apparatus 30 includes a label information controller 30*a*. The label information controller 30*a* generates and transmits label information including at least one of communication medium information as information on a communication medium (communication format) used in communication with other apparatuses and communication cost information as information on communication costs of communication performed by the self apparatus.

The communication apparatus 20 includes a route controller 21 and a communication controller 22. The route controller 21 receives label information, and creates a list of routes for use in communication with the other end of communication. The route controller 21 detects a communication route through which communication is to be performed from the route list. The communication controller 22 executes communication control for communicating with the other end of communication (communication apparatus 10).

The label information controller 30a of the relaying apparatus 30 receives label information transmitted from another relaying apparatus, and transfers the received label information and the label information associated with the self apparatus together toward the communication apparatus 20 having sent a communication request.

The route controller 21 of the communication apparatus 20 receives the label information transmitted via the relaying apparatuses 30-1 to 30-n. Then, the route controller 21 recognizes a communication medium of the communication apparatus 10 and the respective communication media of the relaying apparatuses 30-1 to 30-n based on the communication medium information contained in the label information.

If it is determined that the communication medium which the communication apparatus 10 as the other end of communication has is different from the communication medium which the self apparatus (communication apparatus 20) has, the route controller 21 creates a list of all routes including relaying apparatuses which enable communication with the communication apparatus 10 using the communication medium included in the self apparatus, out of the relaying apparatuses 30-1 to 30-n.

Thereafter, the route controller 21 recognizes respective communication costs of the relaying apparatuses 30-1 to 30-n, based on the communication cost information contained in the label information, and detects a communication route which is lowest in communication costs from the route list. The communication controller 22 performs communication with the communication apparatus 10 through the detected communication route.

Figure 2:
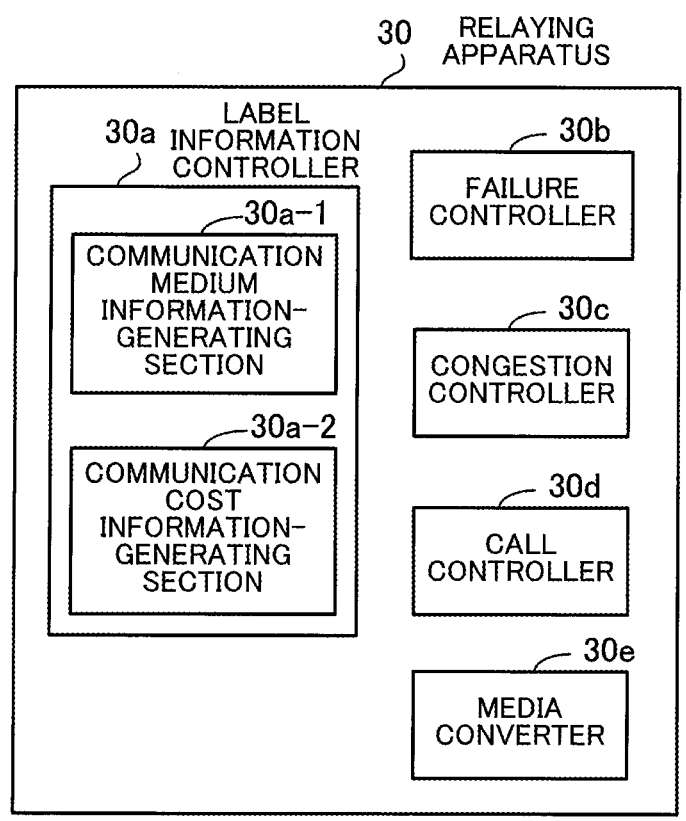
FIG. 2 illustrates a configuration of a relaying apparatus.

Next, a description will be given of a configuration of the relaying apparatus 30. FIG. 2 illustrates a configuration of the relaying apparatus 30. The relaying apparatus 30 includes the label information controller 30a, a failure controller 30b, a congestion controller 30c, a call controller 30d, and a media converter 30e.

The label information controller 30a includes a communication medium information-generating section 30a-1 and a communication cost information-generating section 30a-2. The communication medium information-generating section 30a-1 generates communication medium information. As the communication medium information, for example, the communication medium information-generating section 30a-1 generates at least one of domain information, IP version information, codec information, and transport information.

The domain information is information indicative of a domain within a network (e.g. a private network) to which the self apparatus (relaying apparatus 30) belongs. The IP version information is information indicative of whether the IP version of the relaying apparatus 30 is IPv4 or IPv6.

The codec information is information indicative of encoding and decoding formats that the relaying apparatus 30 has. For example, as for the audio codec, the codec information indicates that the relaying apparatus 30 has the ITU-T G. 711 codec, the ITU-T G. 729 codec, or both of the codec functions.

The transport information is information indicative of a transport function by which the relaying apparatus 30 executes data communication. For example, the transport information indicates a type of the transport function, such as data communication by ATM (Asynchronous Transfer Mode) or by SONET/SDH (Synchronous Optical Network/Synchronous Digital Hierarchy).

The communication cost information-generating section 30a-2 generates the communication cost information. Communication costs are intended to mean costs generated when communication is performed via the relaying apparatus 30, and corresponds e.g. to an amount of delay caused by passing through the self apparatus or a degree of signal deterioration caused in the self codec (as for the audio codec, a degree of deterioration in audio data). In the communication cost information-generating section 30a-2, the communication cost information is generated by quantifying these parameters on a relaying apparatus-by-relaying apparatus.

On the other hand, when a failure occurs, the failure controller 30b detects a location of the failure, generates failure information including the location of the failure, and transmits the failure information to an adjacent apparatus. The congestion controller 30c detects congestion which occurs during relayed communication, and variably sets a value of communication costs generated by the communication cost information-generating section 30a-2 according to a degree of the detected congestion.

For example, the congestion controller 30c performs control such that the value of communication costs is increased when the frequency of congestion exceeds a threshold value set in advance, for a predetermined time period, and the same is reduced when the frequency of congestion does not exceed the threshold value. By thus varying the value of communication costs according to the congestion state, it is possible to generate communication cost information according to the current state of communication.

The call controller 30d performs call control for generating a communication route by recognizing, based on call control information transmitted from the communication apparatus 10 or 20, an apparatus (a relaying apparatus or a communication apparatus) toward which a path is to be generated, and an apparatus toward which a path is not to be generated.

The media converter 30e performs control for converting data of one communication medium to data of the other communication medium. For example, when the relaying apparatus 30 is provided with the ITU-T G.711 communication medium and the ITU-T G. 729 communication medium, the media converter 30e converts ITU-T G.711 audio data to ITU-T G. 729 audio data or converts ITU-T G. 729 audio data to ITU-T G. 711 audio data.

Figure 3:
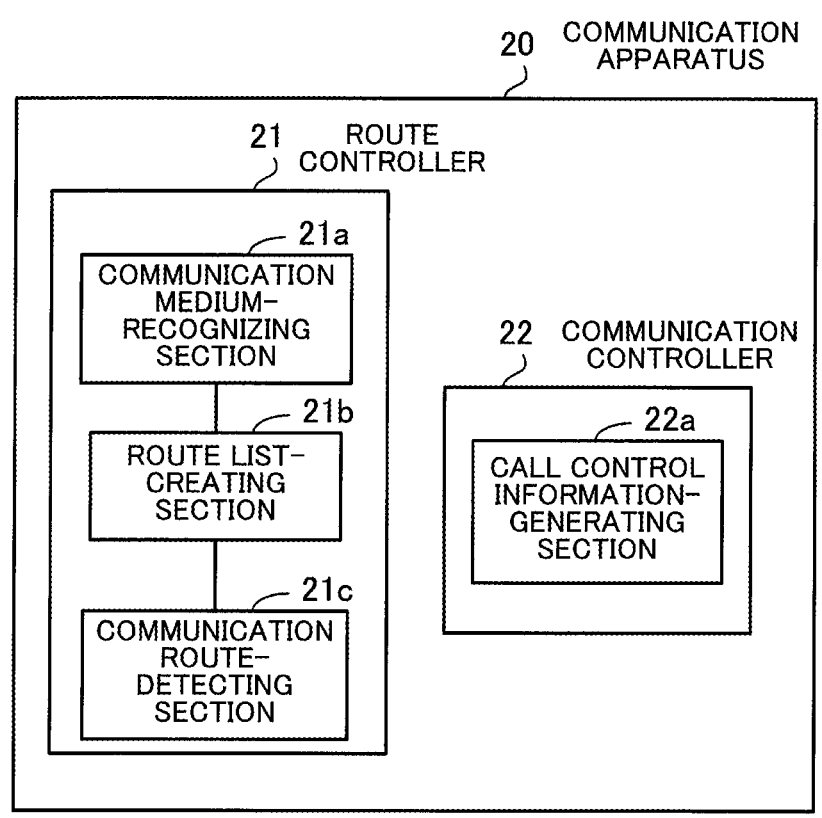
FIG. 3 illustrates a configuration of a communication apparatus.

Next, a description will be given of a configuration of the communication apparatus 20. FIG. 3 illustrates an example of the configuration of the communication apparatus 20. The communication apparatus 20 includes the route controller 21 and the communication controller 22. The route controller 21 includes a communication medium-recognizing section 21a, a route list-creating section 21b, and a communication route-detecting section 21c. The communication controller 22 includes a call control information-generating section 22a.

The communication medium-recognizing section 21a recognizes a communication medium of the communication apparatus 10 as the other end of communication and respective communication media of the relaying apparatuses 30-1 to 30-n based on the communication medium information contained in all items of the label information transmitted from the communication apparatus 10 and the relaying apparatuses 30-1 to 30-n.

When a communication medium that the communication apparatus 10 as the other end of communication has is different from a communication medium that the self apparatus has, the route list-creating section 21b creates a route list by detecting all routes defined according to whether communication of the communication apparatus 20 with the communication apparatus 10 is possible, i.e. whether the communication is made possible by passing through which of the relaying apparatuses 30-1 to 30-n or by bypassing which of the same (without passing through which relaying apparatuses).

The communication route-detecting section 21c recognizes the communication costs of each of the relaying apparatuses 30-1 to 30-n based on the communication cost information contained in the label information transmitted from the relaying apparatuses 30-1 to 30-n. Then, the communication route-detecting section 21c detects a communication route lowest in communication costs in the created route list.

The call control information-generating section 22a generates call control information for performing communication with the communication apparatus 10, and transmits the generated call control information through the detected communication route. The call control information contains information for instructing the relaying apparatuses located on the communication route to generate a path, and information for instructing the relaying apparatuses located out of the communication route not to generate a path.

Figure 4:
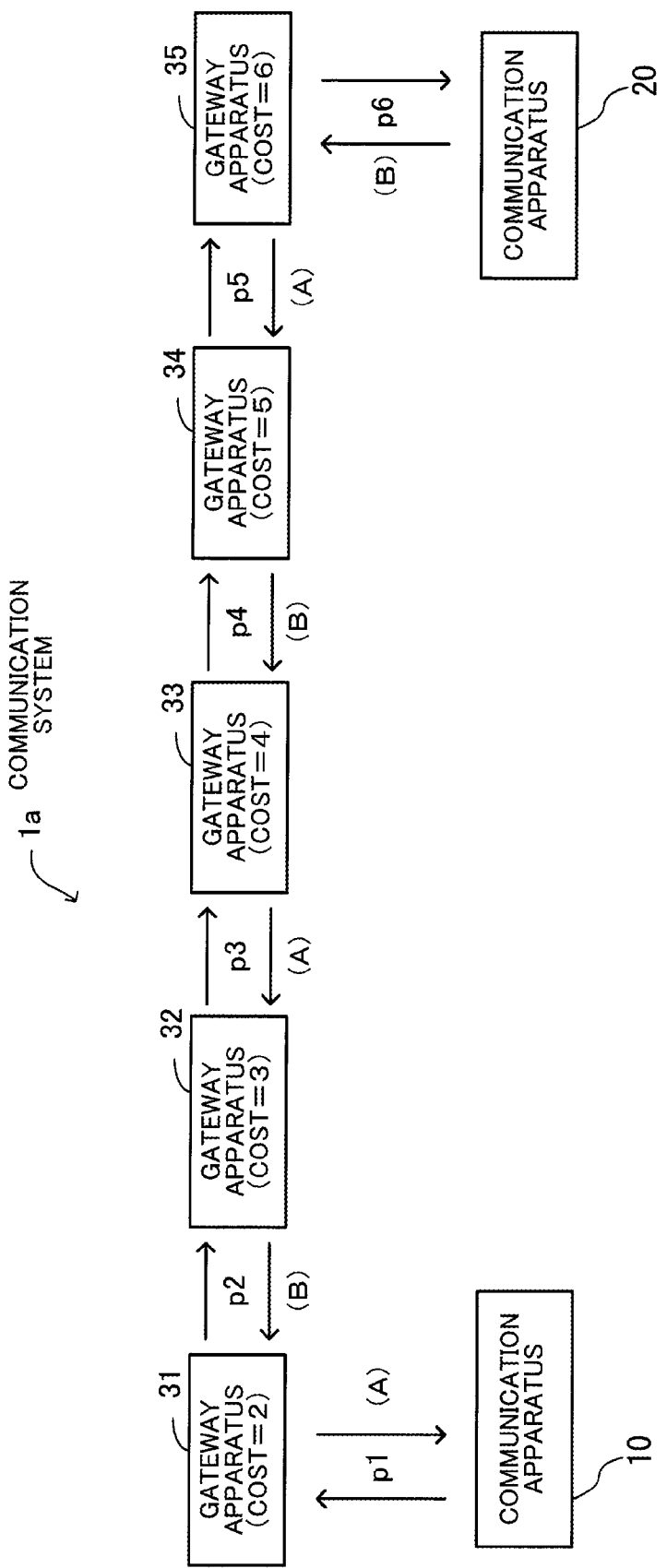
FIG. 4 illustrates an example of a communication system.

Next, a detailed description will be given of the control for detecting an optimum communication route based on an example. Note that the relaying apparatuses are hereinafter referred to as the gateway apparatuses. FIG. 4 illustrates an example of the communication system. The communication system 1a includes the communication apparatuses 10 and 20, and gateway apparatuses 31 to 35.

As the current state of path establishment of the communication system 1a, a path p1 is established between the communication apparatus 10 and the gateway apparatus 31, and a path p2 is established between the gateway apparatuses 31 and 32.

Further, a path p3 is established between the gateway apparatuses 32 and 33, and a path p4 is established between the gateway apparatuses 33 and 34. Further, a path p5 is established between the gateway apparatuses 34 and 35, and a path p6 is established between the gateway apparatus 35 and the communication apparatus 20.

On the other hand, as for the communication media used between the apparatuses, communication using a communication medium A is possible between the communication apparatus 10 and the gateway apparatus 31, and communication using a communication medium B is possible between the gateway apparatuses 31 and 32.

Communication using the communication medium A is possible between the gateway apparatuses 32 and 33, and communication using the communication medium B is possible between the gateway apparatuses 33 and 34. Further, communication using the communication medium A is possible between the gateway apparatuses 34 and 35, and communication using the communication medium B is possible between the gateway apparatus 35 and the communication apparatus 20.

Furthermore, as for the communication costs (hereinafter simply referred to as the cost) of the gateway apparatuses 31 to 35, it is assumed that the cost of the gateway apparatus 31 is equal to 2, the cost of the gateway apparatus 32 is equal to 3, the cost of the gateway apparatus 33 is equal to 4, the cost of the gateway apparatus 34 is equal to 5, and the cost of the gateway apparatus 35 is equal to 6.

FIG. 5 illustrates how the label information is transmitted, and FIG. 6 illustrates the label information and the communication medium information. The apparatuses of the communication system 1a each generate the label information including information of the cost and the communication medium which the self apparatus has, and each transmit the generated label information to an adjacent apparatus.

The gateway apparatus 31 generates label information d1 to the effect that the cost thereof is equal to 2, communication with the communication apparatus is performed using the communication medium A, and communication with the gateway apparatus 32 is performed using the communication medium B, and transmits the generated label information d1 to the gateway apparatus 32.

The gateway apparatus 32 generates label information d2 to the effect that the cost thereof is equal to 3, and communication with each adjacent gateway apparatus is performed using the communication medium A or B, and transmits the label information d1 and d2 to the gateway apparatus 33.

The gateway apparatus 33 generates label information d3 to the effect that the cost thereof is equal to 4, and communication with each adjacent gateway is performed using the communication medium A or B, and transmits the label information d3 to the gateway apparatus 34 together with the label information d1 and d2.

The gateway apparatus 34 generates label information d4 to the effect that the cost thereof is equal to 5, and communication with each adjacent gateway is performed using the communication medium A or B, and transmits the label information d4 to the gateway apparatus 35 together with the label information d1 to d3.

The gateway apparatus 35 generates label information d5 to the effect that the cost thereof is equal to 6, and communication with each adjacent gateway is performed using the communication medium A or B, and transmits the label information d5 to the communication apparatus 20 together with the label information d1 to d4.

Although in the above description, since the communication apparatus 20 has sent a communication request, transmission of the label information in a direction from the communication apparatus 10 toward the communication apparatus 20 via the gateway apparatuses 31 to 35 is illustrated, when the communication apparatus 10 has sent a communication request, the label information is transmitted in the reverse direction, i.e. in a direction from the communication apparatus 20 toward the communication apparatus 10 via the gateway apparatuses 31 to 35.

Further, the communication medium information in the label information may be not mere information on a type of the communication medium which the self apparatus has, but information which makes it possible to recognize detailed network topology at the time of transmission of the label information, such as information indicative of which paths are each established by which communication medium.

On the other hand, the gateway apparatus 31 has a function of converting the direction from the communication apparatus 10 toward the communication apparatus 20 (A→B) to the direction from the communication apparatus 20 toward the communication apparatus 10 (B→A). This is defined as the medium conversion information (A−B).

Further, the gateway apparatus 32 has a function of converting the direction from the communication apparatus 10 toward the communication apparatus 20 (B→A) to the direction from the communication apparatus 20 toward the communication apparatus 10 (A→B). This is defined as the medium conversion information (B−A).

Now, let us consider that the communication apparatus 20 performs communication with the communication apparatus 10. The communication apparatus 20 receives the transmitted label information d1 to d5, and recognizes the communication medium which each of the communication apparatus 10 and the gateway apparatuses 31 to 35 has.

When the communication apparatus 20 communicates with the communication apparatus 10, it is most preferable that the communication apparatus 20 is capable of directly communicating with the communication apparatus 10 without the gateway apparatuses and the like. However, in the present example, the label information d1 indicates that the communication medium of the communication apparatus 10 is the communication medium A, which differs from the communication medium B of the communication apparatus 20, and hence the communication apparatus 20 recognizes that it is impossible to perform direct communication but it is necessary to perform medium conversion-based communication via the gateway apparatuses 31 to 35.

Note that if the communication apparatus 10 has the same communication medium B as the communication apparatus 20 does, the communication apparatus 20 recognizes this fact from the label information d1, and performs direct communication with the communication apparatus 10 using the communication medium B without via the gateway apparatuses 31 to 35.

Further, the above-mentioned communication medium corresponds to at least one of the domain information, the IP version information, the codec information, and the transport information, mentioned hereinabove.

In a case where the communication medium is the domain information, for example, when one apparatus (apparatus a) has a domain D1, and the other apparatus (apparatus b) has a domain D2 which differs from the domain D1, direct communication is not possible between the apparatuses a and b (uniqueness of an address is closed by a domain, so that communication over the domains is not possible). Therefore, in this case, communication between the apparatuses a and b is performed via a gateway apparatus having a function of converting an address format.

In a case where the communication medium is the IP version information, for example, when the IP version of the apparatus a is IPv4, and that of the apparatus b is IPv6, direct communication is not possible between the apparatuses a and b. Therefore, communication between the apparatuses a and b is executed via a gateway apparatus having both of communication functions of IPv4 and IPv6.

In a case where the communication medium is the codec information, for example, when the apparatus a has the ITU-T G. 711 codec, and the apparatus b has the ITU-T G. 729 codec, direct communication is not possible between the apparatuses a and b. Therefore, communication between the apparatuses a and b is performed via a gateway apparatus having a function of converting the codec between ITU-T G. 711 and ITU-T G. 729.

In a case where the communication medium is the transport information, for example, when the apparatus a has an ATM transport function, and the apparatus b has an IP transport function, direct communication is not possible between the apparatuses a and b. Therefore, communication between the apparatuses a and b is performed via a gateway apparatus having a function of converting the transport function between ATM and IP.

Therefore, whichever of the above-mentioned information items the communication medium may be, if the apparatuses a and b both include the same communication medium, communication therebetween is possible, whereas if the apparatuses a and b do not have the same communication medium, communication therebetween is not possible, and in this case, communication is performed via a gateway apparatus that performs appropriate medium conversion.

Next, a description will be given of a plurality of routes between the communication apparatuses and 20 of the communication system 1a. The communication apparatus 20 detects, based on the communication medium information described in the label information d1 to d5, routes defined according to whether communication with the communication apparatus 10 is made possible by passing through which of the gateway apparatuses 31 to 35 or by bypassing which of the same (without passing through which gateway apparatuses).

In the case of the communication system 1a, as main routes via which the communication apparatus 20 can communicate with the communication apparatus 10, there are eight possible routes (referred to as routes L1 to L8). Each route will be described hereafter.

FIG. 7 illustrates the route L1. From the label information d1 and d3, it is known that communication is possible between the communication apparatus 10 and the gateway apparatus 33 using the communication medium A (because it is known from the label information d1 that the communication apparatus 10 can perform communication using the communication medium A, (from the label information d1 that the gateway apparatus 31 has the medium conversion information (A—B), and from the label information d3 that the gateway apparatus 33 has the medium conversion information (A–B)), and from the label information d3 and d4, it is known that the gateway apparatus 33 and the gateway apparatus 34 can perform communication using the communication medium B (because it is known from the label information d3 that the gateway apparatus 33 has the communication medium B, and from the label information d4 that the gateway apparatus 34 has the communication medium B).

Further, it is known from the label information d4 and d5 that the gateway apparatus 34 and the gateway apparatus 35 can communicate using the communication medium A, and from the label information d5 that the gateway apparatus 35 and the communication apparatus 20 itself can communicate using the communication medium B.

Therefore, based on the above-described label information, it is detected that the route L1 which passes through the communication apparatus 10, the gateway apparatuses 33, 34, and 35, and the communication apparatus 20 exists as a route for communication to be performed between the communication apparatuses 10 and 20 on the communication system 1a. The route L1 includes the path p7, the path p4, the path p5, and the path p6.

Figure 8:
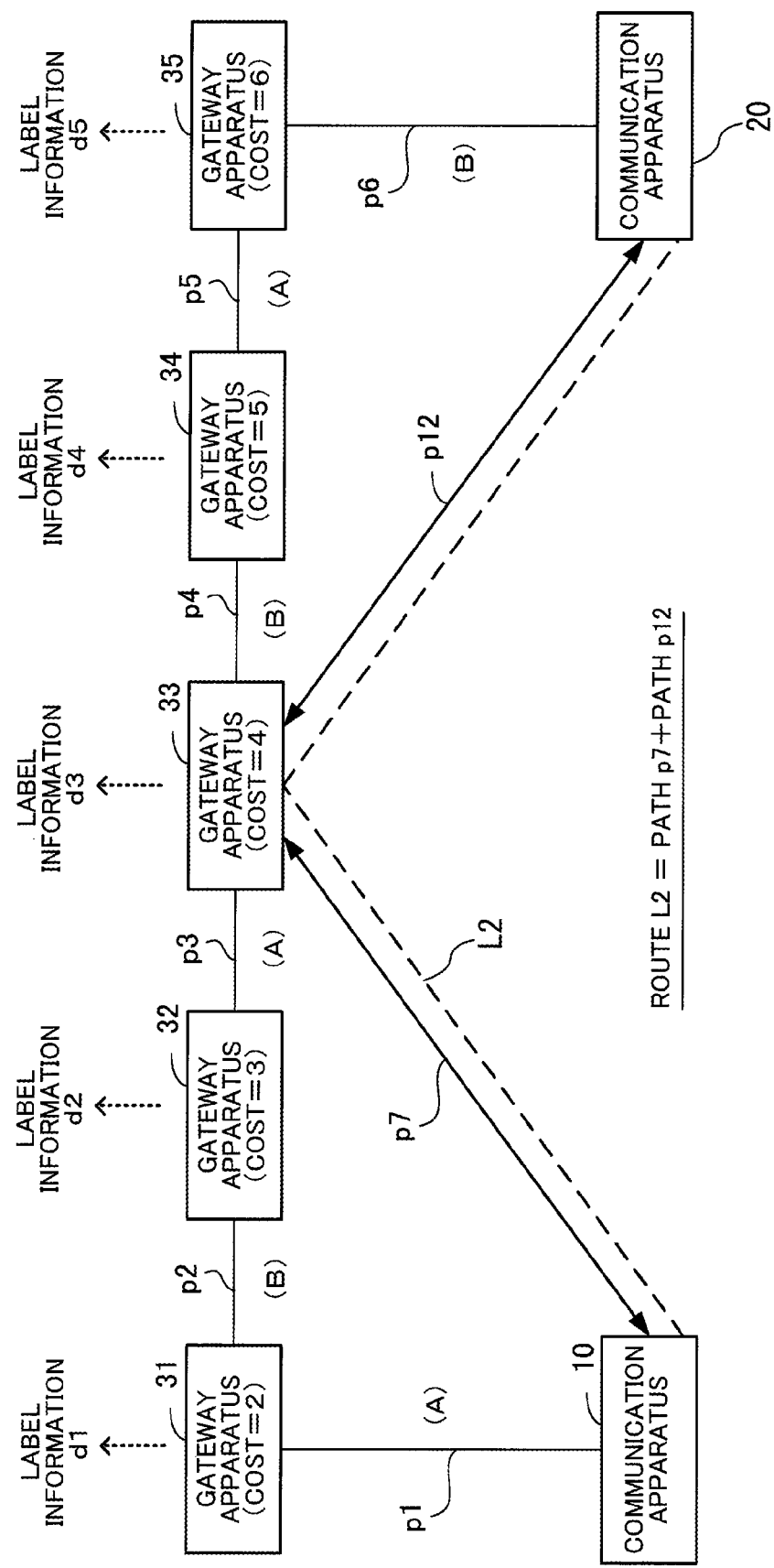
FIG. 8 illustrates a route.

FIG. 8 illustrates the route L2. It is known from the label information d1 and d3 that the communication apparatus 10 and the gateway apparatus 33 can communicate using the communication medium A, and from the label information d3 that the gateway apparatus 33 and the communication apparatus 20 itself can communicate using the communication medium B.

Therefore, based on the above-described label information, it is detected that the route L2 which passes through the communication apparatus 10, the gateway apparatus 33, and the communication apparatus 20 exists as a route for communication to be performed between the communication apparatuses 10 and 20 on the communication system 1a. The route L2 includes the path p7 and a path p12.

Figure 9:
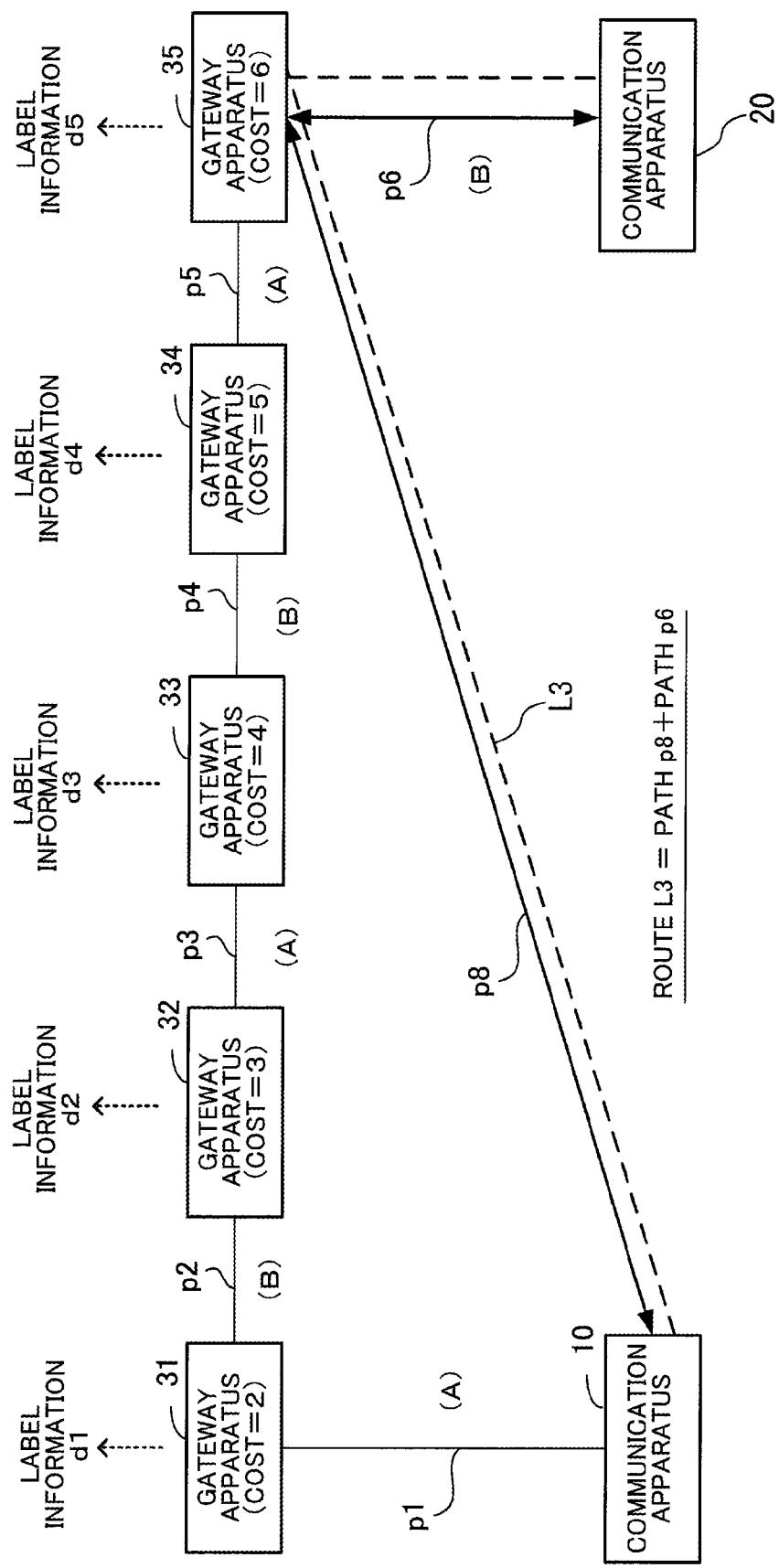
FIG. 9 illustrates a route.

FIG. 9 illustrates the route L3. It is known from the label information d1 and d5 that the communication apparatus 10 and the gateway apparatus 35 can communicate using the communication medium A, and from the label information d5 that the gateway apparatus 35 and the communication apparatus 20 itself can communicate using the communication medium B.

Therefore, based on the above-described label information, it is detected that the route L3 which passes through the communication apparatus 10, the gateway apparatus 35, and the communication apparatus 20 exists as a route for communication to be performed between the communication apparatuses 10 and 20 on the communication system 1a. The route L3 includes the path p8 and the path p6.

Figure 10:
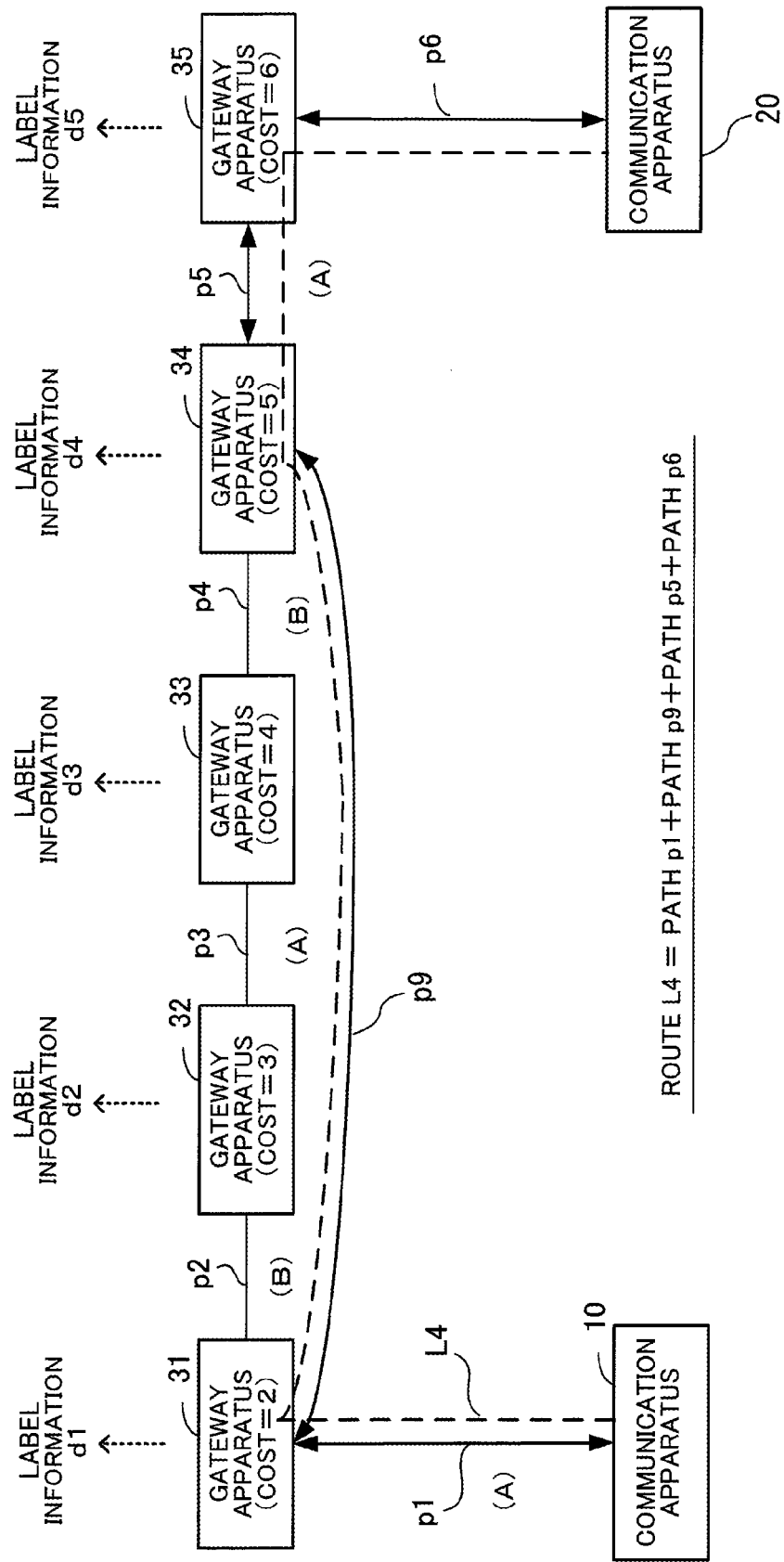
FIG. 10 illustrates a route.

FIG. 10 illustrates the route L4. It is known from the label information d1 that the communication apparatus 10 and the gateway apparatus 31 can communicate using the communication medium A, and from the label information d1 and d4 that the gateway apparatus 31 and the gateway apparatus 34 can communicate using the communication medium B.

Further, it is known from the label information d4 and d5 that the gateway apparatus 34 and the gateway apparatus 35 can communicate using the communication medium A, and from the label information d5 that the gateway apparatus 35 and the communication apparatus 20 itself can communicate using the communication medium B.

Therefore, based on the above-described label information, it is detected that the route L4 which passes through the communication apparatus 10, the gateway apparatuses 31, 34, and 35, and the communication apparatus 20 exists as a route for communication to be performed between the communication apparatuses 10 and 20 on the communication system 1a. The route L4 includes the path p1, the path p9, the path p5, and the path p6.

Figure 11:
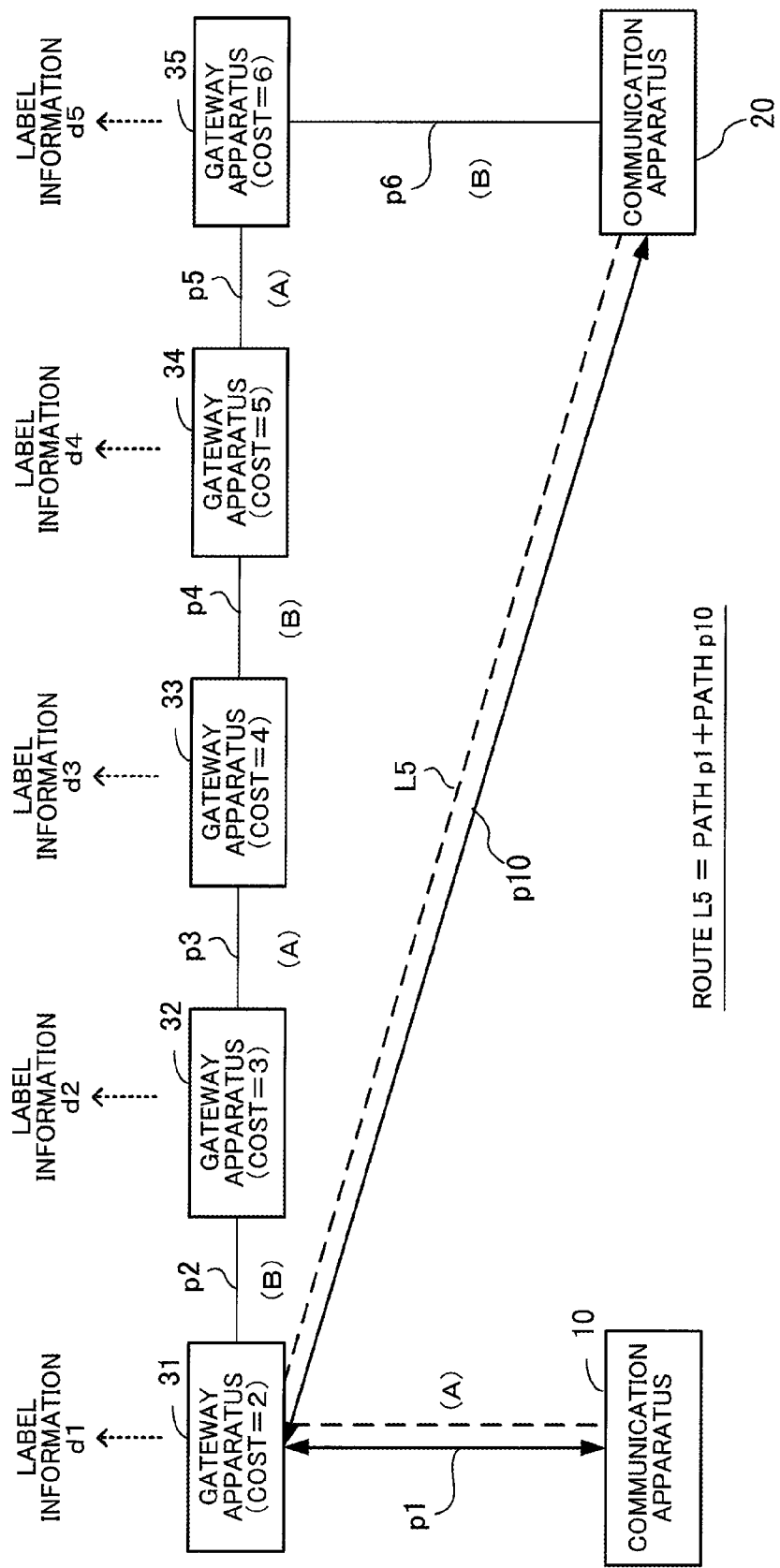
FIG. 11 illustrates a route.

FIG. 11 illustrates the route L5. It is known from the label information d1 that the communication apparatus 10 and the gateway apparatus 31 can communicate using the communication medium A, and from the label information d1 that the gateway apparatus 31 and the communication apparatus 20 itself can communicate using the communication medium B.

Therefore, based on the above-described label information, it is detected that the route L5 which passes through the communication apparatus 10, the gateway apparatuses 31, and the communication apparatus 20 exists as a route for communication to be performed between the communication apparatuses 10 and 20 on the communication system 1a. The route L5 includes the path p1 and a path p10.

Figure 12:
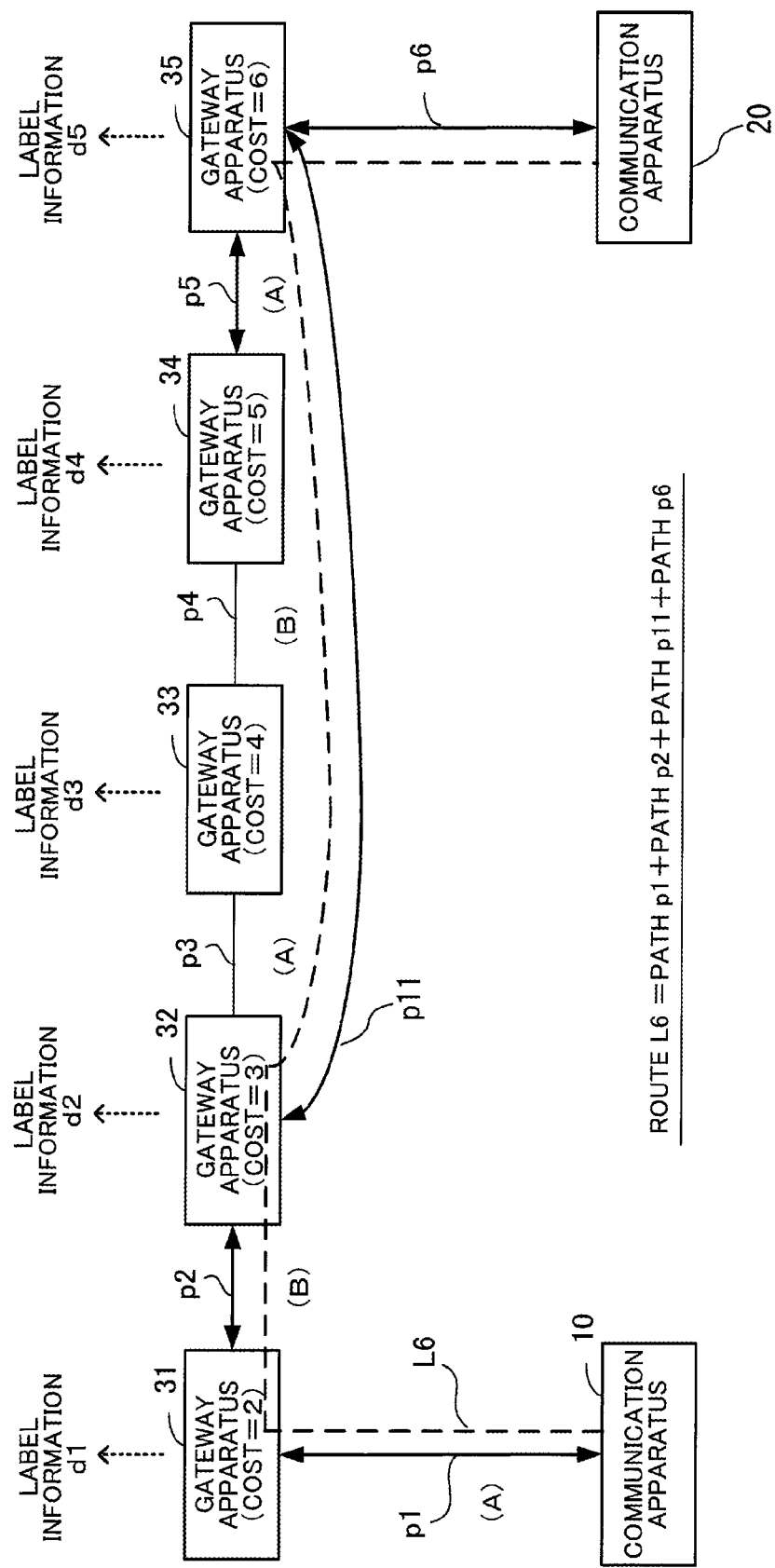
FIG. 12 illustrates a route.

FIG. 12 illustrates the route L6. It is known from the label information d1 that the communication apparatus 10 and the gateway apparatus 31 can communicate using the communication medium A, and from the label information d1 and d2 that the gateway apparatus 31 and the gateway apparatus 32 can communicate using the communication medium B.

Further, it is known from the label information d2 and d5 that the gateway apparatus 32 and the gateway apparatus 35 can communicate using the communication medium A, and from the label information d5 that the gateway apparatus 35 and the communication apparatus 20 itself can communicate using the communication medium B.

Therefore, based on the above-described label information, it is detected that the route L6 which passes through the communication apparatus 10, the gateway apparatuses 31, 32, and 35, and the communication apparatus 20 exists as a route for communication to be performed between the communication apparatuses 10 and 20 on the communication system 1a. The route L6 includes the path p1, the path p2, a path p11, and the path p6.

Figure 13:
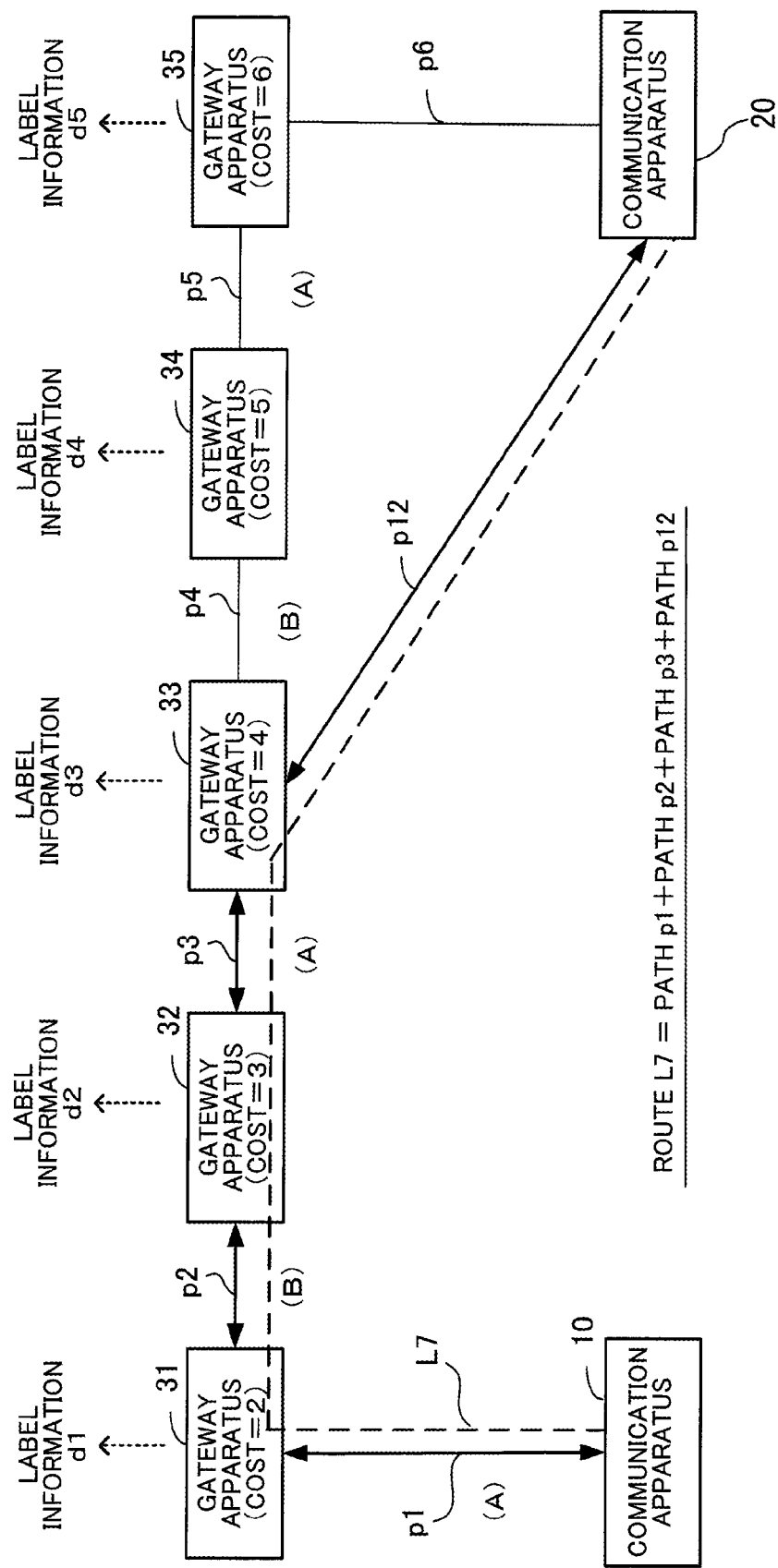
FIG. 13 illustrates a route.

FIG. 13 illustrates the route L7. It is known from the label information d1 that the communication apparatus 10 and the gateway apparatus 31 can communicate using the communication medium A, and from the label information d1 and d2 that the gateway apparatus 31 and the gateway apparatus 32 can communicate using the communication medium B.

Further, it is known from the label information d2 and d3 that the gateway apparatus 32 and the gateway apparatus 33 can communicate using the communication medium A, and from the label information d3 that the gateway apparatus 33 and the communication apparatus 20 itself can communicate using the communication medium B.

Therefore, based on the above-described label information, it is detected that the route L7 which passes through the communication apparatus 10, the gateway apparatuses 31, 32, and 33, and the communication apparatus 20 exists as a route for communication to be performed between the communication apparatuses 10 and 20 on the communication system 1a. The route L7 includes the path p1, the path p2, the path p3, and the path p12.

Figure 14:
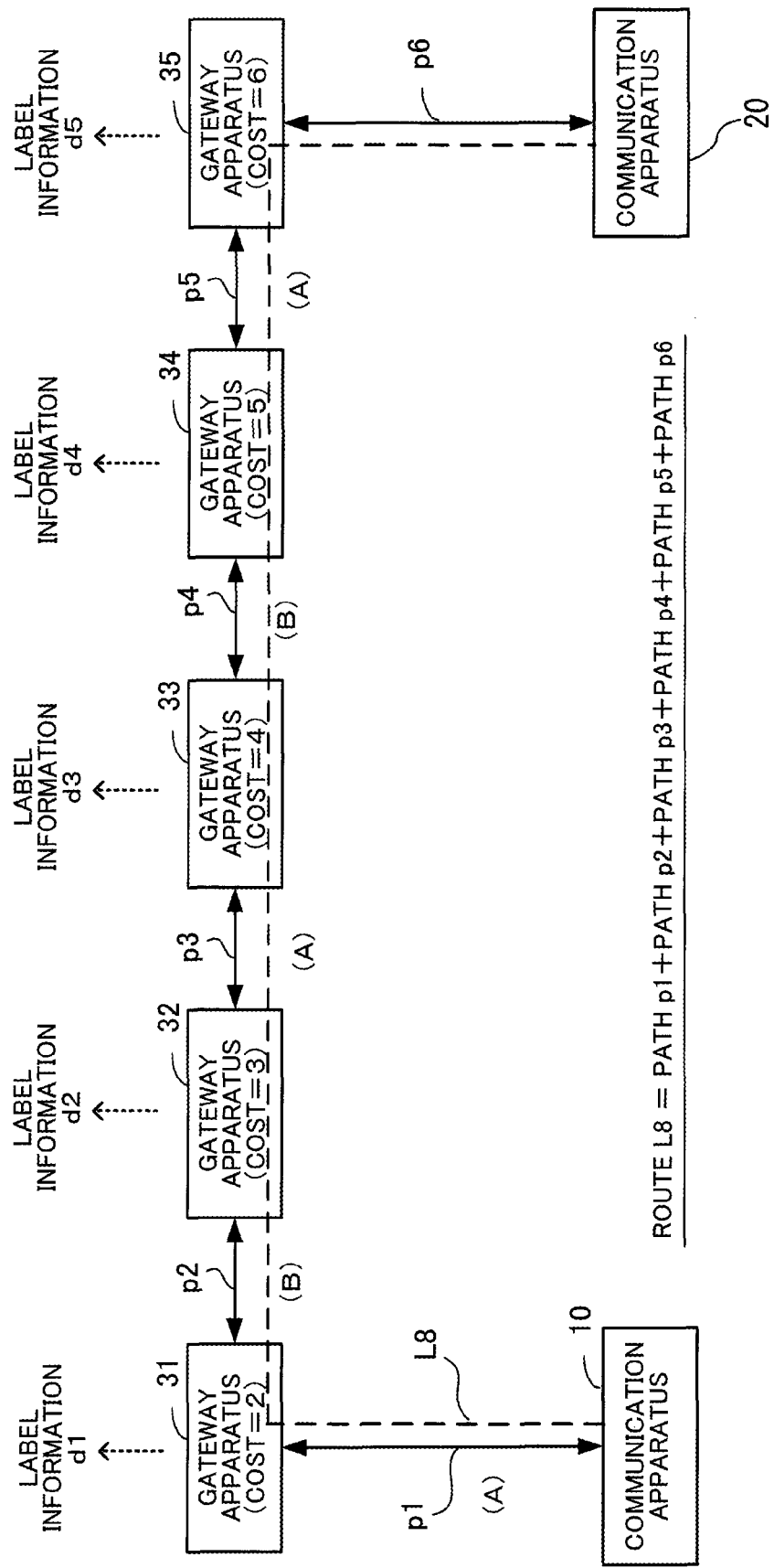
FIG. 14 illustrates a route.

FIG. 14 illustrates the route L8. It is known from the label information d1 that the communication apparatus 10 and the gateway apparatus 31 can communicate using the communication medium A, and from the label information d1 and d2 that the gateway apparatus 31 and the gateway apparatus 32 can communicate using the communication medium B.

Further, it is known from the label information d2 and d3 that the gateway apparatus 32 and the gateway apparatus 33 can communicate using the communication medium A, and from the label information d3 and d4 that the gateway apparatus 33 and the gateway apparatus 34 can communicate using the communication medium B.

Furthermore, it is known from the label information d4 and d5 that the gateway apparatus 34 and the gateway apparatus 35 can communicate using the communication medium A, and from the label information d5 that the gateway apparatus 35 and the communication apparatus 20 itself can communicate using the communication medium B.

Therefore, based on the above-described label information, it is detected that the route L8 which passes through the communication apparatus 10, the gateway apparatuses 31, 32, 33, 33, 34, and 35, and the communication apparatus 20 exists as a route for communication to be performed between the communication apparatuses 10 and 20 on the communication system 1a. The route L8 includes the path p1, the path p2, the path p3, the path p4, the path p5 and the path p6. FIG. 15 illustrates the route list containing the routes L1 to L8 (the arrangement of the route list is given by way of an example).

Figure 16:
FIG. 16 illustrates reduced costs of each route.

Next, a description will be given of calculation of a reduced cost of each detected route. FIG. 16 illustrates a reduced cost of each route. The route L1 is a transmission path which passes through the gateway apparatuses 33, 34, and 35 and bypasses the gateway apparatuses 31 and 32. Therefore, from the label information d1 and d2, the reduced cost of the route L1 amounts to 5 (=2+3).

The route L2 is a transmission line which passes through the gateway apparatus 33, and bypasses the gateway apparatuses 31, 32, 34, and 35. Therefore, from the label information d1, d2, d4, and d5, the reduced cost of the route L2 amounts to 16 (=2+3+5+6).

The route L3 is a transmission line which passes through the gateway apparatus 35, and bypasses the gateway apparatuses 31, 32, 33, and 34. Therefore, from the label information d1, d2, d3, and d4, the reduced cost of the route L3 amounts to 14 (=2+3+4+5l).

The route L4 is a transmission line which passes through the gateway apparatuses 31, 34, and 35, and bypasses the gateway apparatuses 32 and 33. Therefore, from the label information d2 and d3, the reduced cost of the route L4 amounts to 7 (=3+4).

The route L5 is a transmission line which passes through the gateway apparatus 31, and bypasses the gateway apparatuses 32, 33, 34, and 35. Therefore, from the label information d2, d3, d4, and d5, the reduced cost of the route L5 amounts to 18 (=3+4+5+6).

The route L6 is a transmission line which passes through the gateway apparatuses 31, 32, and 35, and bypasses the gateway apparatus 33. Therefore, from the label information d3 and d4, the reduced cost of the route L6 amounts to 9 (=4+5).

The route L7 is a transmission line which passes through the gateway apparatuses 31, 32, and 33, and bypasses the gateway apparatuses 34 and 35. Therefore, from the label information d4 and d5, the reduced cost of the route L7 has amounts to 11 (=5+6).

The route L8 is a transmission line which passes through the gateway apparatuses 31 to 35, and bypasses no gateway. Therefore, the reduced cost of the route L8 amounts to 0.

Next, a description will be given of a process for detecting an optimum communication route and a process for generating call control information. As is apparent from FIG. 16, the largest value of the reduced costs of the routes L1 to L8 is equal to 18. Therefore, when communication is performed between the communication apparatuses 10 and 20 on the communication system 1*a*, the route L5, of which the reduced cost amounts to 18, is a transmission line which enables communication at the lowest cost, and therefore the communication apparatus 20 selects the route L5 as the optimum communication route.

Figure 17:
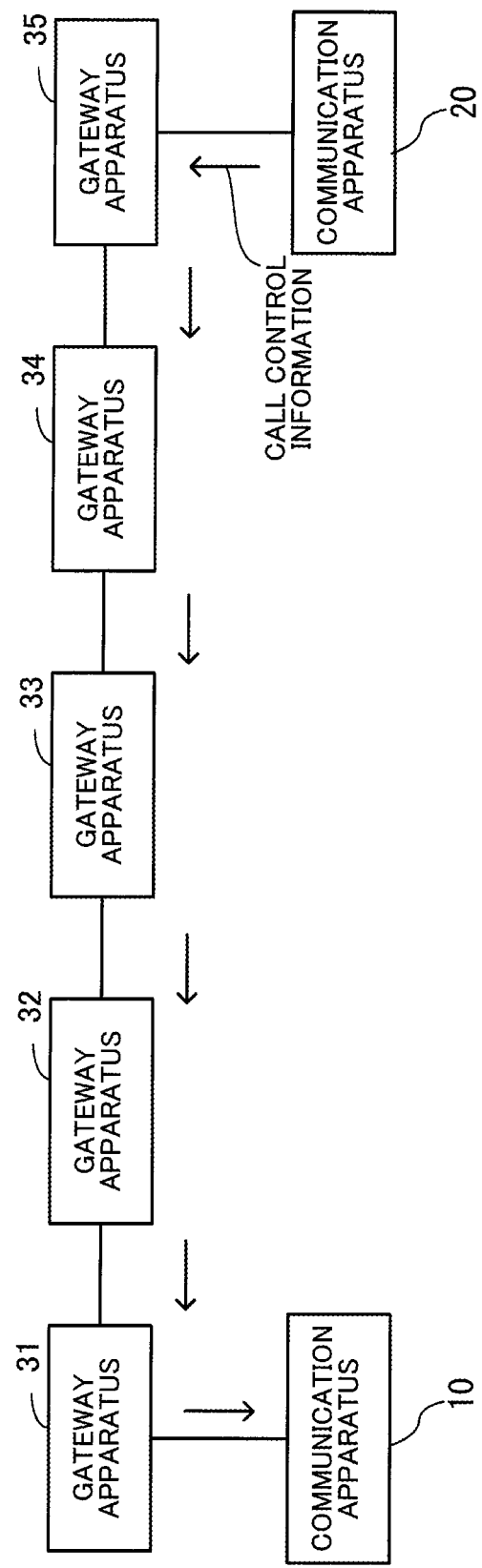
FIG. 17 illustrates how call control information is transmitted.

FIG. 17 illustrates how call control information is transmitted. The communication apparatus 20 determines to perform communication with the communication apparatus 10 through the selected route L5 by passing through the gateway apparatus 31 and bypassing the gateway apparatuses 32, 33, 34, and 35.

The communication apparatus 20 generates the call control information which includes an instruction given to the gateway apparatus 31 to cause the same to generate a path to the target apparatus, and contents to the effect that the gateway apparatuses 32, 33, 34, and 35 are bypassed (instructions not to require path generation).

The communication apparatus 20 transmits the call control information to the gateway apparatus 35. The call control information is transmitted to the communication apparatus 10 through the currently set paths via the gateway apparatuses 35, 34, 33, 32, and 31, in the mentioned order.

Figure 18:
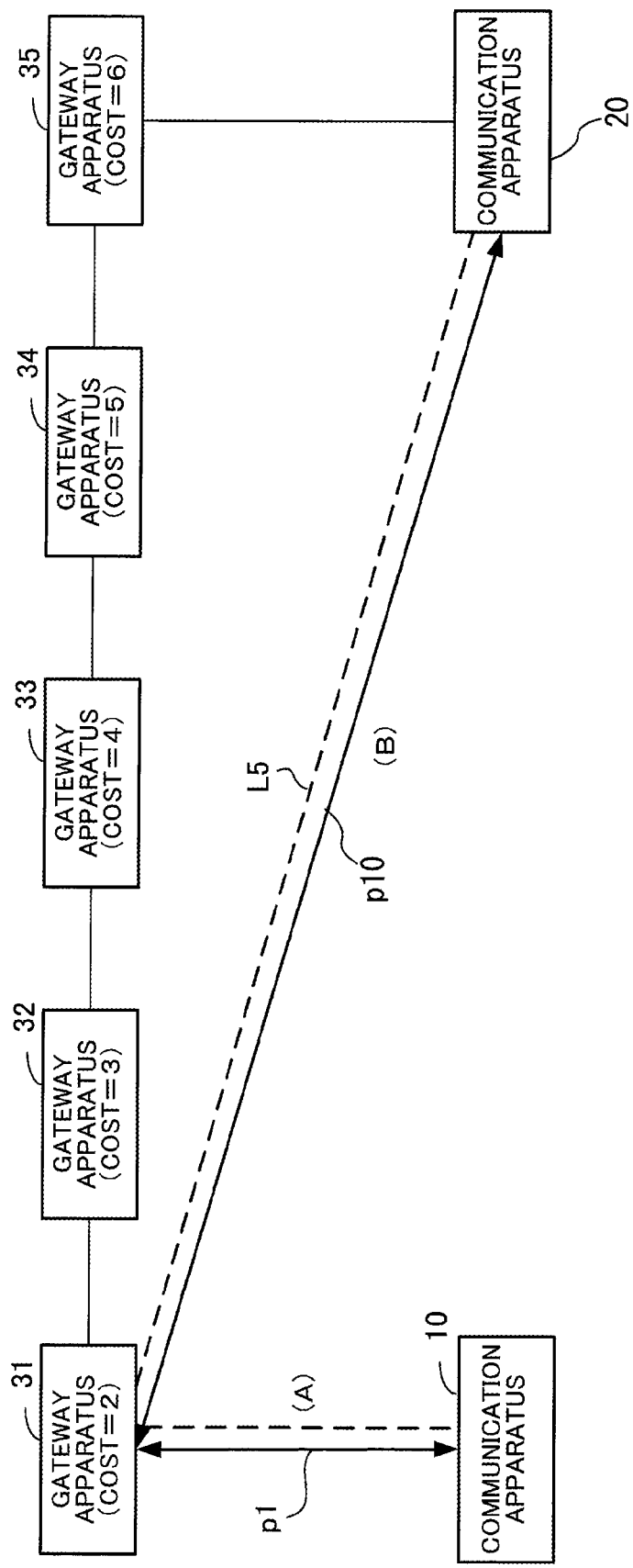
FIG. 18 illustrates a communication system in which an optimum route is established.
Figure 20:
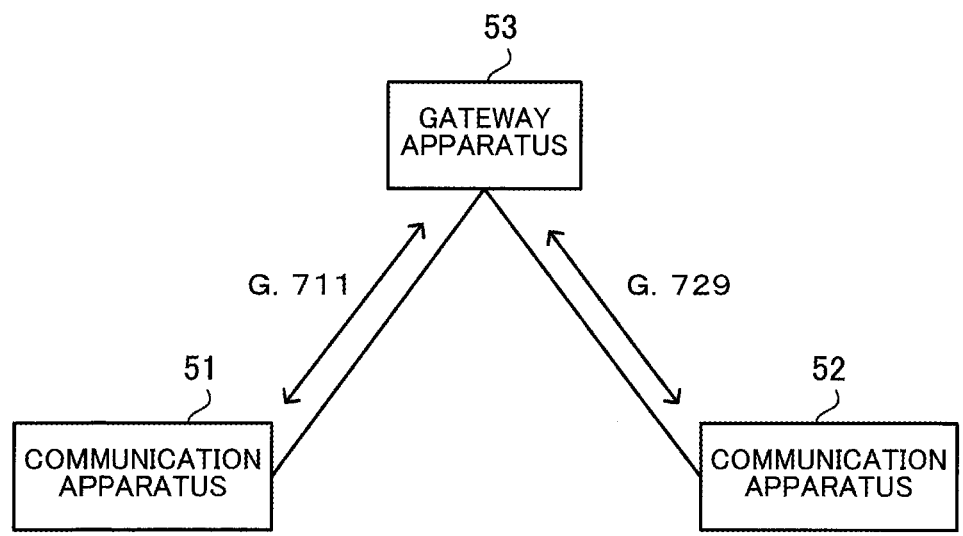
FIG. 20 illustrates VoIP audio communication via a gateway apparatus.
Figure 21:
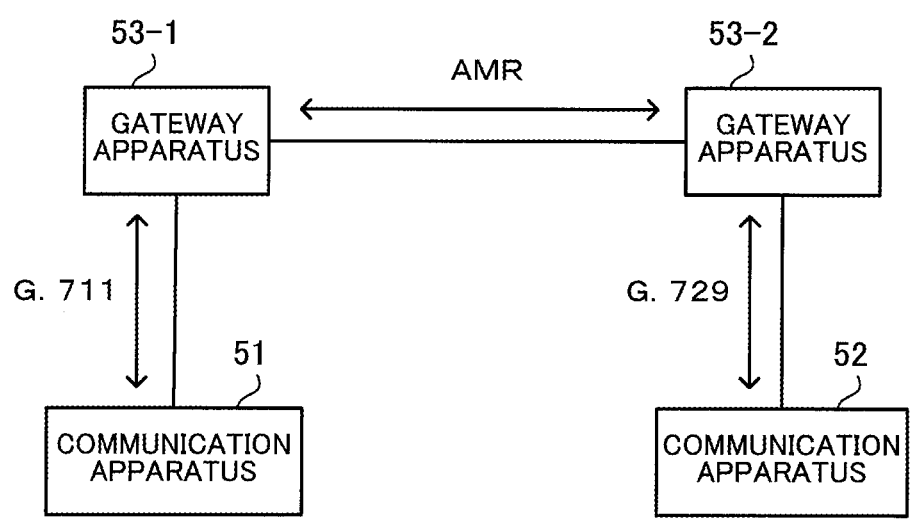
FIG. 21 illustrates VoIP audio communication via gateway apparatuses.
Figure 22:
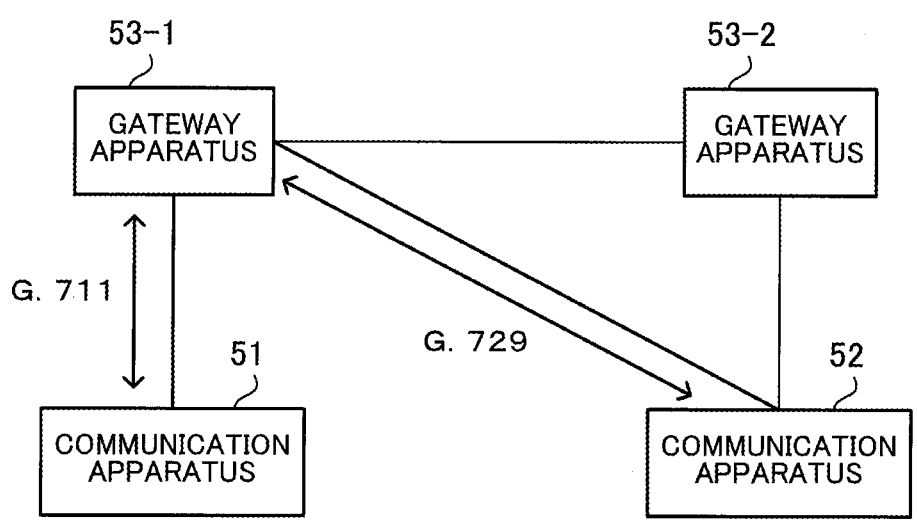
FIG. 22 illustrates VoIP audio communication via a gateway apparatus.

FIG. 18 illustrates the communication system in which the optimum route L5 is established. Each apparatus receives the call control information and recognizes specific call control to be executed by the self apparatus. As a result, the path p1 is established between the communication apparatus 10 and the gateway apparatus 31, and the path p10 is established between the gateway apparatus 31 and the communication apparatus 20. This makes it possible to perform communication through the route L5 lowest in cost in the communication between the communication apparatuses 10 and 20 of the communication system 1*a*.

In the above description, in the calculation of communication costs in detecting the optimum communication route, for each of the routes L1 to L8, a reduced cost is calculated as a sum of costs of bypassed gateway apparatuses, and a route having a largest value of the reduced cost is set as the optimum communication route.

However, for each of the routes L1 to L8, a sum of costs of gateway apparatuses to be passed through may be calculated, and a route having a smallest value of the sum of costs (referred to as "necessary cost") may be set as the optimum communication route.

For example, the route L1 passes through the gateway apparatuses 33, 34, and 35, and hence the necessary cost is equal to 15 (=4+5+6). The route L2 passes through the gateway apparatus 33, and hence the necessary cost is equal to 4. The route L3 passes through the gateway apparatus 35, and hence the necessary cost is equal to 6.

The route L4 passes through the gateway apparatuses 31, 34, and 35, and hence the necessary cost is equal to 13 (=2+5+6). The route L5 passes through the gateway apparatus 31, and hence the necessary cost is equal to 2.

The route L6 passes through the gateway apparatuses 31, 32, and 35, and hence the necessary cost is equal to 11 (=2+3+6). The route L7 passes through the gateway apparatuses 31, 32, and 33, and hence the necessary cost is equal to 9 (=2+3+4). The route L8 passes through the gateway apparatuses 31, 32, 33, 34, and 35, and hence the necessary cost is equal to 20 (=2+3+4+5+6). Therefore, the smallest value of the above-mentioned necessary costs is equal to 2, and hence the detected optimum communication route is the route L5.

Although in the above description, the optimum communication route is detected based on the communication medium information and the communication cost information, the configuration may be such that the optimum communication route is detected by causing failure information to be transmitted in a manner contained in the label information, and a route avoiding a location of the failure is detected.

As described above with reference to FIG. 2, when a failure occurs, the failure controller 30*b* of the relaying apparatus 30 detects a location of the failure, and generates the failure information including the location of the failure. The failure information is transmitted to an adjacent apparatus toward the communication apparatus 20.

In this case, the label information including the communication medium information, the communication cost information, and the failure information may be generated and transmitted to the adjacent apparatus, or only failure information may be transmitted separately from the label information at a time of occurrence of a failure.

The communication apparatus 20 receives the failure information, and recognizes the location of the failure having occurred on the network. Then, the communication apparatus 20 extracts routes which avoid the location of the failure, and detects a communication route lowest in communication costs, out of the extracted routes. By performing this control, even when a failure occurs, it is possible to detect an optimum communication route lowest in communication costs.

As described above, according to the communication system 1, the label information including the communication medium information and the communication cost information is transmitted. Then, a list of all routes including relaying apparatuses which enable the communication apparatus to communicate with the other end of communication using a communication medium which the self apparatus has is created based on the communication medium information, and the respective communication costs of the plurality of relaying apparatuses are recognized based on the communication cost information. Then, a route lowest in communication costs in the route list is detected.

With this configuration, the optimum communication route is selected, whereby useless transmission traffic is reduced, and network resources can be reduced. Further, it is also possible to reduce the number of gateway apparatuses installed.

Further, by selecting the optimum communication route, it is possible to perform transmission reduced in delay, and it is further possible to minimize signal deterioration caused by repetition of encoding and decoding by codec.

It is possible to improve communication efficiency.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions, and alterations could be made hereto without departing from the spirit and scope of the invention.

What is claimed is:

1. A communication system comprising:
   a plurality of relaying apparatuses each including a label information controller that generates and transmits label information including communication medium information, which is information on a communication medium for use in communication with other apparatuses, and communication cost information, which is information on communication costs; and
   a communication apparatus including a route controller that receives the label information to create a list of routes for use in communication with the other end of communication, and detects a communication route through which communication is to be performed, from the list of routes, and a communication controller that performs control of communication with the other end of communication,
   wherein the label information controller transmits the label information transmitted and received from other relaying apparatuses and the label information related to the self relaying apparatus together, toward the communication apparatus,
   wherein the communication controller performs direct communication with the other end of communication without via the relaying apparatus, when it is determined by the route controller that the communication medium which the other end of communication has is the same as the communication medium which the self communication apparatus has;
   wherein the route controller:
   recognizes the communication medium of the other end of communication and the respective communication media of the plurality of relaying apparatuses, based on the communication medium information;
   creates a list of all routes including, out of the plurality of relaying apparatuses, relaying apparatuses which enable the communication apparatus to communicate with the other end of communication using the communication medium which the self communication apparatus has, when it is determined that the communication medium which the other end of communication has differs from the communication medium which the self communication apparatus has; and
   recognizes the communication costs of each of the plurality of relaying apparatuses based on the communication cost information, and detects the communication route which is a route lowest in communication costs in the list of routes,
   wherein the communication controller performs communication with the other end of communication through the communication route; and
   wherein the route controller calculates a reduced cost as a sum of communication costs of bypassed relaying apparatuses for each of the routes and detects an optimum communication route having a largest reduced cost among the calculated reduced costs, as the communication route.

2. The communication system according to claim 1, wherein the label information controller generates at least one of domain information, IP version information, codec information, and transport information, as the communication medium information.

3. The communication system according to claim 1, wherein the relaying apparatuses each further include a failure controller that generates and transmits failure information when a failure occurs, and
   wherein the route controller recognizes a route in which a failure occurs, based on the failure information, extracts routes avoiding a location of the failure from the list of routes, and detects the communication route lowest in communication costs, from the extracted routes.

4. The communication system according to claim 1, wherein the relaying apparatuses each further include a congestion controller that detects occurrence of congestion, and
   wherein the congestion controller varies a value of communication costs according to a degree of occurrence of the detected congestion.

5. A relaying apparatus comprising:
   a label information controller that generates and transmits label information including at least one of communication medium information as information on a communication medium for use in communication with communication apparatuses and communication cost information as information on communication costs; and
   a failure controller that generates failure information when a failure occurs, and transmits generated failure information to an adjacent apparatus,
   wherein the label information controller transmits the label information transmitted and received from other relaying apparatuses and the label information related to the self relaying apparatus together, toward an adjacent apparatus;
   wherein the label information controller generates at least one of domain information, IP version information, codec information, transport information and network topology information indicative of which paths are each established by which communication medium, as the communication medium information,
   wherein the label information controller generates the communication cost information including at least one of an amount of delay caused by passing through the self relaying apparatus or a degree of signal deterioration caused in a codec of the self relaying apparatus; and
   wherein a communication apparatus calculates a reduced cost as a sum of communication costs of bypassed relaying apparatuses for each route and detects an optimum communication route having a largest reduced cost among the calculated reduced costs, as a communication route.

6. The relaying apparatus according to claim 5 further includes a congestion controller that detects occurrence of congestion, wherein the congestion controller varies a value of communication costs according to a degree of occurrence of the detected congestion.

7. A communication apparatus comprising:
   a route controller that receives label information transmitted from relaying apparatuses, the label information including communication medium information, which is information on a communication medium, and communication cost information, which is information on communication costs, to create a list of routes for use in communication with the other end of communication, and detect a communication route through which communication is to be performed from the list of routes; and
   a communication controller that performs control of communication with the other end of communication,
   wherein the communication controller performs direct communication with the other end of communication without via the relaying apparatus, when it is determined by the route controller that the communication medium which the other end of communication has is the same as the communication medium which the self communication apparatus has;

wherein the route controller:

recognizes the communication medium of the other end of communication and the respective communication media of the plurality of relaying apparatuses, based on the communication medium information;

creates a list of all routes including, out of the plurality of relaying apparatuses, relaying apparatuses which enable the communication apparatus to communicate with the other end of communication using the communication medium which the self communication apparatus has, when it is determined that the communication medium which the other end of communication has differs from the communication medium which the self communication apparatus has; and recognizes the communication costs of each of the plurality of relaying apparatuses based on the communication cost information, and detects the communication route which is a route lowest in communication costs in the list of routes, wherein the communication controller performs communication with the other end of communication through the communication route; and wherein the route controller calculates a reduced cost as a sum of communication costs of bypassed relaying apparatuses for each of the routes and detects an optimum communication route having a largest reduced cost among the calculated reduced costs, as the communication route.

8. The communication apparatus according to claim 7, wherein the route controller recognizes a route in which a failure occurs, based on the failure information transmitted from the relaying apparatuses, extracts routes avoiding a location of the failure from the list of routes, and detects the communication route lowest in communication costs, from the extracted routes.

* * * * *